United States Patent [19]

Mosher

[11] 4,189,505

[45] Feb. 19, 1980

[54] PORK-LIKE FLAVORANT AND PROCESS FOR PREPARING SAME

[75] Inventor: Arthur J. Mosher, Marysville, Ohio

[73] Assignee: Societe d'Assistance Technique pour Produits Nestle S.A., Lausanne, Switzerland

[21] Appl. No.: 872,247

[22] Filed: Jan. 25, 1978

[51] Int. Cl.$^2$ .............................................. A23L 1/231
[52] U.S. Cl. ................................... 426/533; 426/650; 426/651; 426/589; 426/656
[58] Field of Search ............... 426/533, 650, 651, 656, 426/657, 516, 589

[56] References Cited

U.S. PATENT DOCUMENTS

| | | | |
|---|---|---|---|
| 2,934,437 | 4/1960 | Morton et al. | 426/533 |
| 3,394,015 | 7/1968 | Giacino | 426/533 |
| 3,394,016 | 7/1968 | Bidmead et al. | 426/533 X |
| 3,532,514 | 10/1970 | May | 426/533 |
| 3,840,674 | 10/1974 | Mosher | 426/533 |

FOREIGN PATENT DOCUMENTS 46-425590  12/1971  Japan.

*Primary Examiner*—Raymond N. Jones
*Assistant Examiner*—Esther M. Kepplinger
*Attorney, Agent, or Firm*—Watson, Leavenworth, Kelton & Taggart

[57] ABSTRACT

A pork-like flavorant which comprises the reaction product of a mixture of (a) a source of amino acid,
(b) a lower aliphatic mercaptocarboxylic acid or a salt thereof, and
(c) oleoresin sage;

said mixture containing from about 5 to about 300 parts by weight of amino acid source per part by weight of mercaptocarboxylic acid and from about 0.005 to about 0.3 part by weight of oleoresin sage per part by weight of mercaptocarboxylic acid, said mixture being substantially free from added monosaccharide.

Other features of the invention appear in the following description.

23 Claims, No Drawings

PORK-LIKE FLAVORANT AND PROCESS FOR PREPARING SAME

BACKGROUND OF THE INVENTION

1. Field of the Invention

This invention relates to the field of meat flavors, and more particularly to pork-like flavors formed by the reaction of an amino acid source with other reactants, as well as preparation of same.

2. Description of the Prior Art

U.S. Pat. No. 2,934,437 describes the preparation of a meat-like flavor by the reaction of a mixture of monosaccharide and a source of amino acid. The use of ribose and cysteine to the exclusion of other amino acids is said to provide a flavor akin to that of pork. U.S. Pat. No. 3,394,015 describes the preparation of a meat-like flavor from the reaction of a proteinaceous substance with a sulfur-containing compound in the absence of a monosaccharide. U.S. Pat. No. 3,532,514 describes the preparation of a meat-like flavor from a mixture of an amino acid source, a mono-, di-, tri-, or polysaccharide and an animal or vegetable fat. Applicant's prior U.S. Pat. No. 3,840,674 describes meat-like flavors obtained from the reaction of S-acetyl-mercaptosuccinic acid or its anhydride with amino acids resulting from the hydrolysis of vegetable protein or yeast. Japanese Patent Publication No. 42590/71 describes meat-like flavors derived from the reaction of an aliphatic mercaptocarboxylic acid such as 2-mercaptopropionic acid, an amino acid and/or protein hydrolysate and a monosaccharide.

SUMMARY OF THE INVENTION

Applicant has surprisingly discovered that when oleoresin sage is reacted with an amino acid source and a lower aliphatic mercaptocarboxylic acid or a salt thereof, the flavor imparted to foodstuffs by the resulting reaction product is distinctly pork-like. Applicant has further discovered that the presence in the reaction mixture of added monosaccharide can detract from the organoleptic quality of the resulting flavor. Accordingly, no appreciable quantities of added monosaccharides are to be included in the reaction mixtures of this invention.

Thus, the pork-like flavorants of this invention comprise the reaction products obtained by reacting a mixture of (a) a source of amino acid,
(b) a lower aliphatic mercaptocarboxylic acid or a salt thereof, and
(c) oleoresin sage;

said mixture containing about 5 to about 300 parts by weight of amino acid source per part by weight of mercaptocarboxylic acid and from about 0.005 to about 0.3 part by weight of oleoresin sage per part by weight of mercaptocarboxylic acid, said mixture further being substantially free from added monosaccharide.

DESCRIPTION OF THE PREFERRED EMBODIMENTS

As the source of amino acid one may use a single amino acid or mixture of such acids. Especially preferred, however, are animal and vegetable protein hydrolysates. Such hydrolysates are well known and readily obtainable from a variety of proteinaceous materials, such as wheat germ, corn gluten, soy protein, linseed protein, peanut press cake, yeast, fish protein, and the like. The amount of amino acid source used is about 5 to 300 parts by weight per part by weight of mercaptocarboxylic acid and preferably is about 50 to 120 parts by weight.

Examples of lower aliphatic mercaptocarboxylic acids which can be used herein include mercaptoacetic acid, 3-mercaptopropionic acid, 2-mercaptopropionic acid, 3,3'-dithiodipropionic acid, and mercaptosuccinic acid. Of these, 2-mercaptopropionic acid is preferred.

In addition, the physiologically acceptable salts of the above acids, such as the sodium, potassium and ammonium mercaptocarboxylates, are also useful in the practice of the present invention. These salts may be used in lieu of the acids or, if desired, in combination therewith.

Additionally, compounds which are capable of being converted into mercaptocarboxylic acids under the reaction conditions set forth hereinafter, such as, disulfide-diacids, are also useful in the practice of the present invention.

If it is desired to prepare a pork-like flavor to be used primarily in gravies, from about 25 to about 300 parts by weight of amino acid source per part by weight of mercaptocarboxylic acid and preferably about 60 to 120 parts by weight is suitable. If the flavorants are to be incorporated into processed foods such as cereal flour, soy protein extrudates, cold cuts and the like, from about 5 to about 200 parts by weight of amino acid source can satisfactorily be used per part by weight of mercaptocarboxylic acid and preferably about 20 to 100 parts by weight. In any event, the amount of oleoresin sage can vary from about 0.005 to about 0.3 part by weight of mercaptocarboxylic acid with 0.006 to 0.2 parts by weight being preferred. As is used herein, the term "oleoresin sage", as is conventionally known in the art, is an extraction of the natural combination of resins and essential oils occurring in sage, as is described in the 1970 edition of the *Oleoresins Handbook* published by Fritzsche-Dodge & Olcott, Inc. and incorporated herein by reference.

In addition to the three main ingredients, spice formulations such as oil of thyme, oleoresin celery, oleoresin clove and the like, may additionally be included in the flavorants of this invention to enhance or modify their organoleptic character. Similarly, essential oils and other natural and synthetic flavor materials may also be incorporated into the reaction mixtures or the flavorants of this invention to achieve desired organoleptic effects. For example, smoked materials, such as aqueous solutions of wood smoke (commercially available under the trade name "CHAR-SOL", manufactured by the Red Arrow Products Company), vegetable oil extracts of aqueous smoke solutions and barley malt, yeast or salt that is treated with aqueous smoke solution (commercially available under the trade name "CHAR-ZYME", manufactured by the Red Arrow Products Company), may advantageously be used to obtain ham or bacon notes within the pork family.

The flavorants are conveniently prepared by combining the amino acid source, lower aliphatic mercaptocarboxylic acid or salt thereof, oleoresin sage and optional ingredients, if any, in a suitable edible liquid reaction medium and heating the mixture in an appropriate container, such as an extruder-cooker or refluxing apparatus at a temperature of about 80 to about 200° C. and preferably about 100 to 150° C. Where the liquid reaction medium used is water, the resulting reaction product is then dried, for example, in hot air, in a vacuum oven or by freeze drying to a moisture content of about 3 to 45% by weight. Where reaction media other than water are used, this drying step is unnecessary. Reaction media which can advantageously be employed herein include water, the edible fats and oils of animal or vegetable origin, edible synthetically prepared oils such as glycerides, and food grade organic solvents such as propylene glycol. The amount of total reactants which can be used with the liquid medium is generally about 0.1 to 3.0 parts reactants per part of liquid medium by weight and preferably about 0.3 to 1.0 part by weight.

The pH of the reaction mixture can vary from about 3 to about 10. However, it has been found that a pH of from about 4 to about 9 provides flavorants of optimum organoleptic qualities, and for this reason is preferred.

The time and temperature of heating the reaction mixture are not critical to obtain a pork-like flavorant, although they can affect the yield and character. When refluxing is used and the reaction medium is water, from as little as 10 minutes to up to 4 hours of heating at reflux temperature will provide good pork-like flavorants. The reflux temperature can vary from about 50° C. to about 130° C. When the reaction mixture is combined with foodstuff ingredients and processed in an extruder-cooker, a residence time of about 5 to 120 seconds and preferably about 10 to 60 seconds at about 100-150° C. is sufficient to provide excellent flavoring qualities. A pressure of about 5-100 atmospheres and preferably about 10 to 40 atmospheres is desirably maintained. When non-aqueous reaction media such as vegetable oil, lard, propylene glycol, etc. are employed, temperatures of from about 70° C. to about 150° C. and reaction times of from about 15 to about 60 minutes provide acceptable results.

It will be appreciated by those skilled in the art, as illustrated in the examples, that the ultimate flavor will be influenced, in varying degrees, by the nature of the reaction medium and the heating conditions, and that a variety of pork-like flavors can be made by practicing the process of this invention.

The following examples, in which all parts are by weight, are illustrative of the flavorants of this invention and their preparation.

EXAMPLE I

30 Parts by weight of corn protein hydrolysate, 0.3 part by weight of 2-mercaptopropionic acid and 0.03 part by weight of oleoresin sage are mixed with 30 parts of water and heated at 120° C. for 30 minutes. The resulting flavorant, in liquid form, is incorporated into an organoleptically bland gravy base at a level of 1 to 2 gm per 100 cc of gravy. A mild and distinct pork-like flavor is imparted to the gravy.

EXAMPLE II

The same ingredients, quantities and reaction conditions as set forth in Example I are used, except that hydrogenated vegetable oil is used in place of water as the reaction medium. The resulting flavorant imparts a mild, fatty pork-like flavor.

EXAMPLE III

The same ingredients, quantities and reaction conditions as set forth in Example I are used, except that propylene glycol is substituted for water as the reaction medium. The resulting flavorant imparts a very mild pork-like flavor, having overtones of roast pork.

EXAMPLE IV

The same ingredients, quantities and reaction conditions as set forth in Example I are used, except that a mixture of equal parts by weight of vegetable oil and water is used as the reaction medium. The resulting flavorant imparts a rich and fatty pork-like flavor.

EXAMPLE V

The following ingredients are refluxed for 60 minutes at 98° C.:

| Ingredient | Parts by Weight |
| --- | --- |
| Corn protein hydrolysate | 197 |
| 2-mercaptopropionic acid | 2 |
| Oleoresin sage | 0.6 |
| Water | 200 |

The reaction mixture is reduced to a paste in a rotating evaporator at 60° C. and 30 to 800 mm Hg. Final water removal is accomplished in a vacuum oven at 20 to 80 mm Hg. at a temperature of 80 to 100° C. The resulting dried flavorant possesses an intense roast pork flavor. When the dried flavorant is incorporated into an organoleptically bland gravy base at 1 g per 100 cc of said base, a delightful pork-flavored gravy is obtained.

EXAMPLES VI-VIII

The following reactant mixtures are prepared:

| Ingredient | Parts by Weight | | |
| --- | --- | --- | --- |
| | VI | VII | VIII |
| Corn protein hydrolysate | 88.05 | 88.05 | 98.4 |
| 2-mercaptopropionic acid | 1.0 | 1.0 | 1.4 |
| Oleoresin sage | .1 | .1 | .2 |
| Linoleic acid | .05 | .05 | — |
| Oleic acid | .05 | .05 | — |
| Lactic acid | .75 | .75 | — |
| Autolyzed yeast | 10.0 | 10.0 | — |

The reactant mixtures of Examples VI and VIII are each dissolved in water to provide solutions containing 25% total solids. The two solutions are separately injected into defatted soy flour at a level of 6%, based upon the soy flour, just prior to extrusion cooking. Each results in a flavored, textured soy product eminently suited for use as a cooked ground pork analog.

The reactant mixture of Example VII is treated as described in Example V. The resulting dry powder is dry-blended with defatted soy flour at a level of 6% and extrusion-cooked at standard conditions for textured soy protein. The resulting pork-flavored, textured soy product has the same excellent flavor characteristics as that of Example VI.

EXAMPLES IX-XII

Using the same procedure as in Example V, pork-like flavorants are prepared from the following reactant mixtures:

| Ingredient | Parts by Weight | | | |
| --- | --- | --- | --- | --- |
| | IX | X | XI | XII |
| Corn protein hydrolysate | 155.5 | 155.5 | 49.5 | — |
| Corn and wheat protein hydrolysate | — | — | 100 | — |
| Autolyzed yeast | 20 | 20 | — | 20 |
| Soy protein hydrolysate | — | — | — | 167 |

-continued

| Ingredient | Parts by Weight | | | |
|---|---|---|---|---|
| | IX | X | XI | XII |
| 2-mercaptopropionic acid | 2 | — | 3 | 12 |
| 3-mercaptopropionic acid | — | 2 | — | — |
| Lactic acid | 1.5 | 1.5 | 5 | 0.5 |
| Linoleic acid | 0.3 | 0.3 | — | — |
| Oleic acid | 0.3 | 0.3 | 1 | — |
| Oleoresin sage | 0.2 | 0.2 | 0.2 | 0.1 |
| Viandoresin chicken* | — | — | — | 0.3 |
| Essential oil of thyme | 0.2 | 0.2 | 0.1 | 0.2 |
| Asparagine | 20 | 20 | — | — |
| Thiamine | — | — | 1 | — |
| Water | 200 | 200 | 200 | 200 |

*A commercial spice blend from Fritzsche-Dodge & Olcott, Inc. When used in gravy applications, each flavorant imparts a fine roast pork flavor.

EXAMPLES XIII-XIV

The following reactant mixtures are prepared:

| Ingredient | Parts by Weight | |
|---|---|---|
| | XIII | XIV |
| Corn protein hydrolysate | 180 | 100 |
| Corn and wheat protein hydrolysate | — | 75 |
| 2-mercaptopropionic acid | 2 | 1.5 |
| Oleoresin sage | 0.2 | 0.3 |
| Smoked yeast | 18 | — |
| Oleoresin clove | 0.5 | 0.7 |
| Smoked malt | — | 20 |
| Oleoresin celery | — | 1.0 |
| Water | 200 | 200 |

These mixtures are individually treated and tested as in Example V. The presence of the smoked ingredients modifies the basic pork flavor to that of cured pork. Gravies made with the flavorant of Example XIII have a ham flavor, and those made with the flavorant of Example XIV have a bacon flavor.

EXAMPLES XV-XVIII

Using the same procedure as in Example V, pork-like flavorants are prepared from the following reactant mixtures:

| Ingredients | Parts by Weight | | | |
|---|---|---|---|---|
| | XV | XVI | XVII | XVIII |
| Corn protein hydrolysate | 197 | 197 | 197 | 197 |
| Oleoresin sage | 0.6 | 0.6 | 0.6 | 0.6 |
| 2-mercaptopropionic acid | — | — | — | — |
| 3-mercaptopropionic acid | 2 | — | — | — |
| Mercaptosuccinic acid | — | 2 | — | — |
| Mercaptoacetic acid | — | — | 2 | — |
| 3,3'-dithiodipropionic acid | — | — | — | 2 |
| Water | 200 | 200 | 200 | 200 |

I claim:

1. A flavorant for imparting a pork-like flavor to foodstuffs, comprising the product obtained by reacting at an elevated temperature in an edible liquid reaction medium a mixture of
   (a) a source of amino acid,
   (b) a lower aliphatic mercaptocarboxylic acid or a salt thereof, and
   (c) oleoresin sage;
said mixture containing from about 5 to about 300 parts by weight of amino acid source per part by weight of mercaptocarboxylic acid and from about 0.005 to about 0.3 part by weight of oleoresin sage per part by weight of mercaptocarboxylic acid, said mixture further being substantially free from added monosaccharide.

2. The flavorant of claim 1, wherein the lower aliphatic mercaptocarboxylic acid is or includes 2-mercaptopropionic acid.

3. The flavorant of claim 1, wherein the lower aliphatic mercaptocarboxylic acid is or includes mercaptoacetic acid, 3-mercaptoproprionic acid, mercaptosuccinic acid, or 3,3'-dithiodipiopionic acid.

4. The flavorant of claim 1, wherein the salt of the mercaptocarboxylic acid is or includes sodium mercaptocarboxylate, potassium mercaptocarboxylate or ammonium mercaptocarboxylate.

5. The flavorant of claim 1, wherein the amino acid source is or includes an animal or vegetable protein hydrolysate.

6. The flavorant of claim 2, wherein the mixture contains from about 25 to about 300 parts by weight of amino acid source per part by weight of 2-mercaptopropionic acid.

7. The flavorant of claim 2, wherein the mixture contains from about 5 to about 200 parts by weight of amino acid source per part by weight of 2-mercaptopropionic acid.

8. The flavorant of claim 1, wherein the pH of the mixture is within the range of about 3 to about 10.

9. The flavorant of claim 1, wherein the pH of the mixture is within the range of about 4 to about 9.

10. The flavorant of claim 2, wherein the pH of the mixture is within the range of about 4 to about 9.

11. The flavorant of claim 1, wherein the mixture additionally contains oil of thyme, oleoresin celery, oleoresin clove or smoke flavorants.

12. Process for preparing a flavorant for imparting a pork-like flavor to foodstuffs, which comprises reacting at an elevated temperature in an edible liquid reaction medium, and in the absence of added monosaccharide, a mixture of
   (a) a source of amino acid,
   (b) a lower aliphatic mercaptocarboxylic acid or a salt thereof, and
   (c) oleoresin sage;
said mixture containing from about 5 to about 300 parts by weight of amino acid source per part by weight of mercaptocarboxylic acid and from about 0.005 to about 0.3 part by weight of oleoresin sage per part by weight of mercaptocarboxylic acid.

13. Process according to claim 12, wherein the liquid reaction medium contains water, and which includes the additional step of drying the reaction product.

14. Process according to claim 12, wherein the liquid reaction medium contains at least one member of the group consisting of water, edible fats or oils, edible synthetic oils and food grade organic solvents.

15. Process according to claim 12, wherein the lower aliphatic mercaptocarboxylic acid is or includes 2-mercaptopropionic acid.

16. Process according to claim 13, wherein the lower aliphatic mercaptocarboxylic acid is or includes 2-mercaptopropionic acid.

17. Process according to claim 14, wherein the lower aliphatic mercaptocarboxylic acid is or includes 2-mercaptopropionic acid.

18. Process according to claim 12, wherein the amino acid source is or includes an animal or vegetable protein hydrolysate.

19. Process according to claim 12, wherein the pH of the reaction mixture is within the range of from about 3 to about 10.

20. Process according to claim 12, wherein the pH of the reaction mixture is within the range of about 4 to about 9.

21. Process according to claim 12, wherein the mixture is reacted by heating in an aqueous medium at about 50° to about 130° C. for about 10 minutes to about 4 hours.

22. Process according to claim 12, wherein the mixture is reacted by heating in a non-aqueous medium at about 70° C. to about 150° C. for about 15 minutes to about 60 minutes.

23. Process according to claim 12, wherein the mixture is combined with extrudable ingredients and reacted in an extrusion cooker.

* * * * *